United States Patent
Ikeda (10) Patent No.: US 10,826,055 B2
(45) Date of Patent: Nov. 3, 2020

(54) ELECTRODE MANUFACTURING APPARATUS

(71) Applicant: TOYOTA JIDOSHA KABUSHIKI KAISHA, Toyota-shi, Aichi-ken (JP)

(72) Inventor: Takenori Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/117,048

(22) Filed: Aug. 30, 2018

(65) Prior Publication Data
US 2019/0123341 A1 Apr. 25, 2019

(30) Foreign Application Priority Data
Oct. 24, 2017 (JP) ................. 2017-205066

(51) Int. Cl.
*B65H 23/32* (2006.01)
*H01M 4/139* (2010.01)
*H01M 10/0525* (2010.01)
*H01M 10/04* (2006.01)

(52) U.S. Cl.
CPC ............ *H01M 4/139* (2013.01); *B65H 23/32* (2013.01); *H01M 10/0404* (2013.01); *H01M 10/0525* (2013.01)

(58) Field of Classification Search
CPC .. H01M 4/0404; H01M 10/0404; B65H 23/32
See application file for complete search history.

(56) References Cited

U.S. PATENT DOCUMENTS 5,845,187 A * 12/1998 Eggerstorfer .......... B65H 23/24
399/384
6,418,851 B1 * 7/2002 Hartmann ............... B41F 13/06
101/247

FOREIGN PATENT DOCUMENTS

JP 2010033727 A 2/2010
JP 2012-084310 A 4/2012

* cited by examiner

*Primary Examiner* — Scott W Dodds
(74) *Attorney, Agent, or Firm* — Sughrue Mion, PLLC (57) ABSTRACT

A turnover apparatus includes a first turnover portion, a second turnover portion, and a third turnover portion each including a convexly curved outer surface. An electrode foil is turned over as the electrode foil is transported along the outer surface of each of the first turnover portion, the second turnover portion, and the third turnover portion in this order. The first turnover portion, the second turnover portion, and the third turnover portion are integrally fixed. Each of the outer surfaces of the first turnover portion, the second turnover portion, and the third turnover portion defines a part of each side of a virtual triangle.

9 Claims, 7 Drawing Sheets

ELECTRODE MANUFACTURING APPARATUS

This nonprovisional application is based on Japanese Patent Application No. 2017-205066 filed with the Japan Patent Office on Oct. 24, 2017, the entire contents of which are hereby incorporated by reference.

BACKGROUND

Field

The present disclosure relates to an electrode manufacturing apparatus.

Description of the Background Art

A process of manufacturing a lithium ion secondary battery includes an electrode making step of making an electrode by forming an electrode composite material layer on opposing surfaces of an electrode foil which forms a core of an electrode. For example, Japanese Patent Laying-Open No. 2012-84310 has conventionally disclosed an electrode manufacturing apparatus including a turnover apparatus which turns over a transported electrode foil such that a first surface and a second surface are replaced in position with each other.

SUMMARY

In order to further improve efficiency in manufacturing a battery, further reduction in size of an electrode manufacturing apparatus has been demanded.

According to the present disclosure, an electrode manufacturing apparatus reduced in size is provided.

According to the present disclosure, an electrode manufacturing apparatus including an electrode composite material layer formation portion and a turnover apparatus is provided. The electrode composite material layer formation portion forms an electrode composite material layer on a first surface and a second surface of an electrode foil, the second surface being opposite to the first surface. The turnover apparatus turns over the electrode foil such that the first surface and the second surface of the electrode foil are replaced in position with each other. The turnover apparatus includes a first turnover portion, a second turnover portion, and a third turnover portion each including a convexly curved outer surface. The first surface and the second surface are replaced in position with each other as the electrode foil is transported along the outer surface of each of the first turnover portion, the second turnover portion, and the third turnover portion in this order. The first turnover portion, the second turnover portion, and the third turnover portion are integrally fixed. The outer surface of each of the first turnover portion, the second turnover portion, and the third turnover portion defines at least a part of each side of a virtual triangle.

According to such a construction, the first turnover portion, the second turnover portion, and the third turnover portion are integrated so that a space required for arrangement of the turnover apparatus is reduced. Accuracy in relative positioning of the first turnover portion, the second turnover portion, and the third turnover portion is improved and position displacement of the electrode foil while the electrode foil passes through the turnover apparatus is suppressed. Therefore, an apparatus for alignment of the electrode foil does not have to be provided at an entrance of the turnover apparatus. Therefore, the electrode manufacturing apparatus can be reduced in size.

In the electrode manufacturing apparatus, the turnover apparatus further includes a base portion including a first side to which the first turnover portion is fixed, a second side to which the second turnover portion is fixed, and a third side to which the third turnover portion is fixed. According to such a construction, the first turnover portion, the second turnover portion, and the third turnover portion can form an integrated structure with the base portion being interposed.

In the electrode manufacturing apparatus, a plurality of outlet holes from which gas is issued to move the electrode foil away from the outer surface are provided in the outer surface of each of the first turnover portion, the second turnover portion, and the third turnover portion. The outer surface includes a first region in which an angle formed by a plane including an axis of center of curvature of the outer surface and intersecting with the outer surface with respect to a plane including the axis of center of curvature and being in parallel to the virtual triangle is not smaller than 60° and a second region in which the angle is smaller than 60°. A flow rate per unit area of the gas issued from the first region is higher than a flow rate per unit area of the gas issued from the second region. According to such a construction, the electrode foil is readily moved away from the outer surface and can readily be turned over.

In the electrode manufacturing apparatus, the first region is smaller in interval between adjacent outlet holes than the second region. According to such a construction, a flow rate per unit area of the gas issued from the first region can be higher than a flow rate per unit area of the gas issued from the second region.

In the electrode manufacturing apparatus, a plurality of outlet holes are identical in shape. According to such a construction, machining of outlet holes is facilitated.

The electrode manufacturing apparatus includes a sensor configured to determine a position of the electrode foil in an orthogonal direction orthogonal to a direction of transportation of the electrode foil and a drive portion configured to move the turnover apparatus in the orthogonal direction. According to such a construction, the electrode foil turned over by the turnover apparatus can be aligned and an apparatus for alignment of the electrode foil does not have to be provided at an exit of the turnover apparatus. Therefore, the electrode manufacturing apparatus can be reduced in size.

In the electrode manufacturing apparatus, the sensor is arranged downstream from the turnover apparatus in the direction of transportation and configured to determine a position in the orthogonal direction of the electrode foil which passed through the turnover apparatus. According to such a construction, a position of the electrode foil can highly accurately be adjusted.

In the electrode manufacturing apparatus, the second turnover portion extends in a direction of transportation of the electrode foil, and the virtual triangle is an isosceles triangle, at least a part of a base of the isosceles triangle being defined by the outer surface of the second turnover portion. According to such a construction, a position of the electrode foil can readily be adjusted with a simplified operation to move the turnover apparatus in the orthogonal direction.

In the electrode manufacturing apparatus, the virtual triangle is an equilateral triangle. According to such a construction, the first turnover portion, the second turnover portion, and the third turnover portion can be identical in shape.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An electrode manufacturing apparatus in an embodiment will be described below with reference to the drawings. The same or substantially the same features in the embodiment shown below have the same reference characters allotted and redundant description will not be repeated.

[Electrode]

Figure 1:
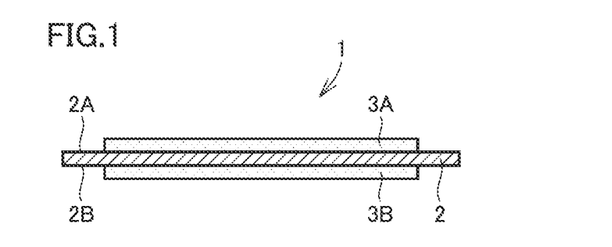
FIG. 1 is a cross-sectional view showing a cross-section in a direction of width of an electrode manufactured with an electrode manufacturing apparatus according to an embodiment.

FIG. 1 is a cross-sectional view showing a cross-section in a direction of width (a lateral direction in FIG. 1) of an electrode 1 manufactured with an electrode manufacturing apparatus 1000 according to an embodiment. As shown in FIG. 1, electrode 1 includes an electrode foil 2 and electrode composite material layers 3A and 3B. Electrode foil 2 is in a form of a band and includes a first surface 2A and a second surface 2B opposite to first surface 2A. Electrode composite material layer 3A is formed on a part of first surface 2A of electrode foil 2. Electrode composite material layer 3B is formed on a part of second surface 2B of electrode foil 2.

Electrode composite material layers 3A and 3B are layers of an active material bonded to electrode foil 2 by coating electrode foil 2 with an adhesive (a binder) and a coating material and drying the same. Electrode composite material layers 3A and 3B are formed around the center in the direction of width of electrode foil 2. Opposing ends of electrode foil 2 in the direction of width are non-coated portions where no electrode composite material layer is formed. A width over which electrode composite material layer 3A is formed is the same as a width over which electrode composite material layer 3B is formed, and a position in the direction of width of electrode composite material layer 3A is the same as a position in the direction of width of electrode composite material layer 3B. Electrode composite material layer 3B is located right behind electrode composite material layer 3A. In the present embodiment, electrode foil 2 has a thickness of approximately 10 μm. Electrode composite material layers 3A and 3B have a thickness, for example, of approximately 40 μm before drying and approximately 30 μm after drying.

There are two types of electrode 1 of a positive electrode and a negative electrode. An aluminum foil is employed as electrode foil 2 of the positive electrode of a lithium ion secondary battery. A coating material used for electrode composite material layers 3A and 3B of the positive electrode contains a positive electrode active material which can occlude and release lithium ions. A lithium composite oxide such as lithium nickel oxide ($LiNiO_2$), lithium manganese oxide ($LiMnO_2$), and lithium cobalt oxide ($LiCoO_2$) is employed as a positive electrode active material.

A copper foil or the like is employed as electrode foil 2 of the negative electrode of a lithium ion secondary battery. A coating material used for electrode composite material layers 3A and 3B of the negative electrode contains a negative electrode active material which can occlude and release lithium ions. A carbon-based material such as amorphous carbon, hard carbon, soft carbon, or graphite is employed as a negative electrode active material. A binder mainly composed of styrene-butadiene rubber (SBR) is employed as an adhesive.

Though the positive electrode and the negative electrode are different in material from each other, they are not much different in width and thickness of electrode foil 2 and electrode composite material layers 3A and 3B. As shown in FIG. 1, both of the positive electrode and the negative electrode include electrode composite material layers 3A and 3B formed on first surface 2A and second surface 2B of electrode foil 2. Therefore, electrode manufacturing apparatus 1000 for a secondary battery in the embodiment can manufacture both of the positive electrode and the negative electrode of the lithium ion secondary battery. The positive electrode and the negative electrode will be described below by being collectively referred to as electrode 1 without particularly being distinguished from each other.

[Electrode Manufacturing Apparatus]

Figure 2:
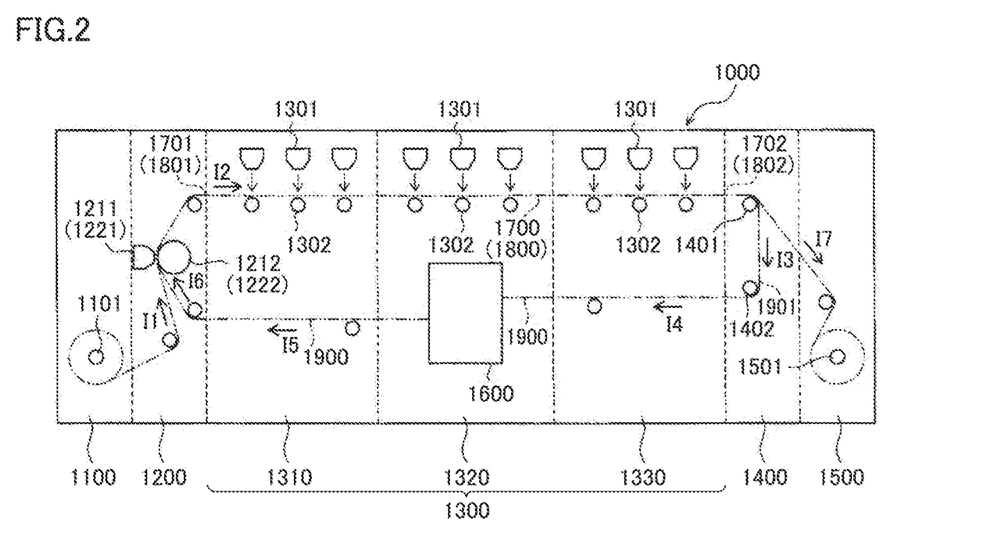
FIG. 2 is a front view showing a schematic construction of the electrode manufacturing apparatus according to the embodiment.
Figure 3:
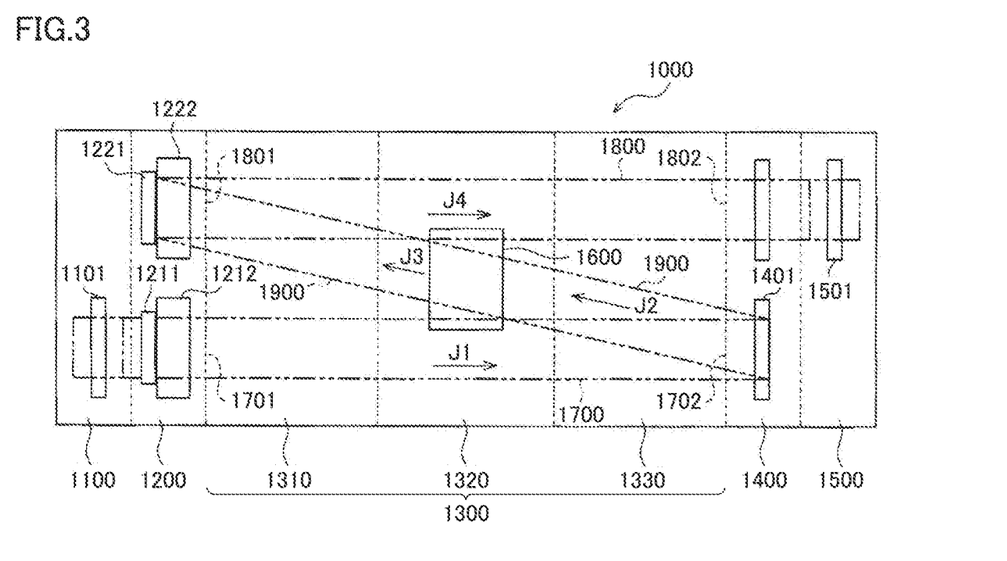
FIG. 3 is a plan view showing the schematic construction of the electrode manufacturing apparatus according to the embodiment.

FIG. 2 is a front view showing a schematic construction of electrode manufacturing apparatus 1000 according to the embodiment. FIG. 3 is a plan view showing the schematic construction of electrode manufacturing apparatus 1000 according to the embodiment. As shown in FIGS. 2 and 3, electrode manufacturing apparatus 1000 in the embodiment includes an unwinding portion 1100, a coating portion 1200, a drying furnace 1300, a fold-back portion 1400, and a wind-up portion 1500.

Unwinding portion 1100 includes an unwinding reel 1101 on which uncoated electrode foil 2 has been wound up like a roll. As pulling force is applied longitudinally to electrode foil 2, uncoated electrode foil 2 is unwound from unwinding reel 1101.

As shown in FIG. 3, coating portion 1200 is constructed to be able to coat electrode foil 2 at two locations. Coating portion 1200 includes a first surface coating die 1211, a second surface coating die 1221, and backup rollers 1212 and 1222. First surface coating die 1211 is a first surface coating apparatus for coating first surface 2A of electrode foil 2 with a coating material. Backup roller 1212 transports electrode foil 2 and supports electrode foil 2 when first surface coating die 1211 coats first surface 2A of electrode foil 2. Second surface coating die 1221 is a second surface coating apparatus for coating second surface 2B of electrode foil 2 with a coating material. Backup roller 1222 transports electrode foil 2 and supports electrode foil 2 when second surface coating die 1221 coats second surface 2B of electrode foil 2. Coating portion 1200 represents one example of an electrode composite material layer formation portion which forms an electrode composite material layer on first surface 2A and second surface 2B of electrode foil 2.

Drying furnace 1300 is a feature which transports therein electrode foil 2 coated with the coating material and dries the coating material. Though drying furnace 1300 shown in FIGS. 2 and 3 is a three-stage drying furnace including a first drying furnace 1310, a second drying furnace 1320, and a third drying furnace 1330 in which three furnaces are connected in series in the direction of transportation of electrode foil 2, drying furnace 1300 is not limited to the three-stage drying furnace. In drying furnace 1300, a first surface drying path 1700, a second surface drying path 1800, and transportation paths 1900 and 1901 preceding coating of the second surface (hereinafter referred to as the "transportation path") are provided.

First surface drying path 1700 is a path for drying a coating material applied to first surface 2A of electrode foil 2. First surface drying path 1700 is provided to extend from drying furnace 1310 to third drying furnace 1330. A start end 1701 of first surface drying path 1700 is an entrance of drying furnace 1300 in transporting electrode foil 2 from coating portion 1200 to drying furnace 1300. An end 1702 of first surface drying path 1700 is an exit where electrode foil 2 is transported out of drying furnace 1300 to fold-back portion 1400.

Second surface drying path 1800 is a path for drying a coating material applied to second surface 2B of electrode foil 2. Second surface drying path 1800 is provided to extend from first drying furnace 1310 to third drying furnace 1330. A start end 1801 of second surface drying path 1800 is an entrance of drying furnace 1300 in transporting electrode foil 2 from coating portion 1200 to drying furnace 1300. An end 1802 of second surface drying path 1800 is an exit where electrode foil 2 is transported out of drying furnace 1300 to fold-back portion 1400.

First surface drying path 1700 and second surface drying path 1800 are arranged in parallel. A direction of transportation and a speed of transportation of electrode foil 2 in second surface drying path 1800 are the same as those in first surface drying path 1700.

Transportation paths 1900 and 1901 are paths for transporting electrode foil 2 of which first surface 2A has been dried from end 1702 of first surface drying path 1700 to second surface coating die 1221. Transportation path 1900 is a path for transporting electrode foil 2 from fold-back portion 1400 to coating portion 1200. Transportation path 1900 is provided to extend from first drying furnace 1310 to third drying furnace 1330. Transportation path 1901 is a path for changing a direction of transportation of electrode foil 2 in fold-back portion 1400. Transportation path 1901 is provided in fold-back portion 1400.

First drying furnace 1310, second drying furnace 1320, and third drying furnace 1330 each include an air nozzle 1301 and a roller 1302 as shown in FIG. 2. Air nozzle 1301 is a nozzle for blowing hot air to an undried coating material. The coating material applied to electrode foil 2 is dried by hot air blown from air nozzle 1301. A temperature, a velocity, and a volume of hot air blown from air nozzle 1301 are common among first drying furnace 1310, second drying furnace 1320, and third drying furnace 1330. Roller 1302 is a free roller for transporting electrode foil 2. FIG. 3 does not show air nozzle 1301 and roller 1302.

First drying furnace 1310, second drying furnace 1320, and third drying furnace 1330 may be different in temperature therein (a temperature of an atmosphere). This is because change in temperature of the coating material over time until the coating material is dried should be suitable for drying of the coating material. In order to gradually dry the coating material, a temperature in first drying furnace 1310 is lowest and a temperature in third drying furnace 1330 is highest.

The coating material applied to first surface 2A of electrode foil 2 is transported along first surface drying path 1700 through first drying furnace 1310, second drying furnace 1320, and third drying furnace 1330 in this order. The coating material applied to second surface 2B of electrode foil 2 is transported along second surface drying path 1800 through first drying furnace 1310, second drying furnace 1320, and third drying furnace 1330 in this order. The coating material applied to first surface 2A and second surface 2B of electrode foil 2 is dried over time in accordance with the same temperature profile.

Electrode manufacturing apparatus 1000 includes a turnover apparatus 1600 in second drying furnace 1320. Turnover apparatus 1600 is an apparatus which turns over transported electrode foil 2 without contacting electrode foil 2 such that first surface 2A and second surface 2B are replaced in position with each other. Turnover apparatus 1600 is provided at a position in transportation path 1900. Turnover apparatus 1600 is arranged downstream from first surface drying path 1700 and upstream from second surface coating die 1221 in the path for transportation of electrode foil 2. Details of a construction and operations of turnover apparatus 1600 will be described later.

Fold-back portion 1400 transports electrode foil 2 of which first surface 2A has been coated and dried toward second surface coating die 1221. Fold-back portion 1400 transports electrode foil 2 from first surface drying path 1700 to transportation path 1900. Fold-back portion 1400 transports electrode foil 2 of which second surface 2B has been coated and dried to wind-up portion 1500.

Fold-back portion 1400 includes fold-back rollers 1401 and 1402. Fold-back roller 1401 is a roller for changing a direction of travel of electrode foil 2 in which the coating material applied to first surface 2A has been dried, into a direction shown with an arrow I3 in FIG. 2. Fold-back roller 1402 is a roller for changing a direction of travel of electrode foil 2 transported from fold-back roller 1401 further into a direction shown with an arrow I4 in FIG. 2.

Wind-up portion 1500 includes a wind-up reel 1501. Wind-up reel 1501 winds up electrode foil 2 on which electrode composite material layers 3A and 3B have been formed.

[Path for Transportation of Electrode Foil 2]

A path for transportation of electrode foil 2 will be described with reference to FIGS. 2 and 3. Electrode foil 2 unwound from unwinding reel 1101 in unwinding portion 1100 is transported to first surface coating die 1211 in coating portion 1200 as shown with an arrow I1 in FIG. 2. First surface 2A of electrode foil 2 is coated by first surface coating die 1211. Electrode foil 2 is transported into drying furnace 1300 as shown with an arrow I2 in FIG. 2. Electrode foil 2 is transported in an orientation shown with an arrow J1 in FIG. 3.

First surface 2A of electrode foil 2 is dried in drying furnace 1300 and electrode foil 2 is transported to fold-back portion 1400. Fold-back roller 1401 in fold-back portion 1400 changes an orientation of electrode foil 2 into the direction shown with arrow I3 in FIG. 2. In succession, an orientation of electrode foil 2 is changed by fold-back roller 1402. Electrode foil 2 is transported in the direction shown with arrow I4 in FIG. 2, that is, a direction shown with an arrow J2 in FIG. 3.

Orientations of first surface 2A and second surface 2B of electrode foil 2 are interchanged by turnover apparatus 1600. Before electrode foil 2 reaches turnover apparatus 1600, second surface 2B of electrode foil 2 faces up, and after electrode foil 2 passes through turnover apparatus 1600, first surface 2A of electrode foil 2 faces up. In succession, electrode foil 2 is transported in a direction shown with an arrow I5 in FIG. 2, that is, a direction shown with an arrow J3 in FIG. 3.

Electrode foil 2 is then transported to second surface coating die 1221 in coating portion 1200 in a direction shown with an arrow I6 in FIG. 2. Second surface coating die 1221 coats second surface 2B of electrode foil 2. Electrode foil 2 is transported in the direction shown with arrow I2 in FIG. 2, that is, a direction shown with an arrow J4 in FIG. 3. The orientation of arrow J4 in FIG. 3 is the same as the orientation of arrow J1. The direction of transportation of electrode foil 2 to drying furnace 1300 in drying the coating material applied to first surface 2A is the same as the direction of transportation of electrode foil 2 to drying furnace 1300 in drying the coating material applied to second surface 2B. The second surface of electrode foil 2 is dried in drying furnace 1300. Electrode foil 2 is then transported in a direction shown with an arrow I7 in FIG. 3 and wound up on wind-up reel 1501 in wind-up portion 1500.

[Construction of Turnover Apparatus 1600]

Figure 4:
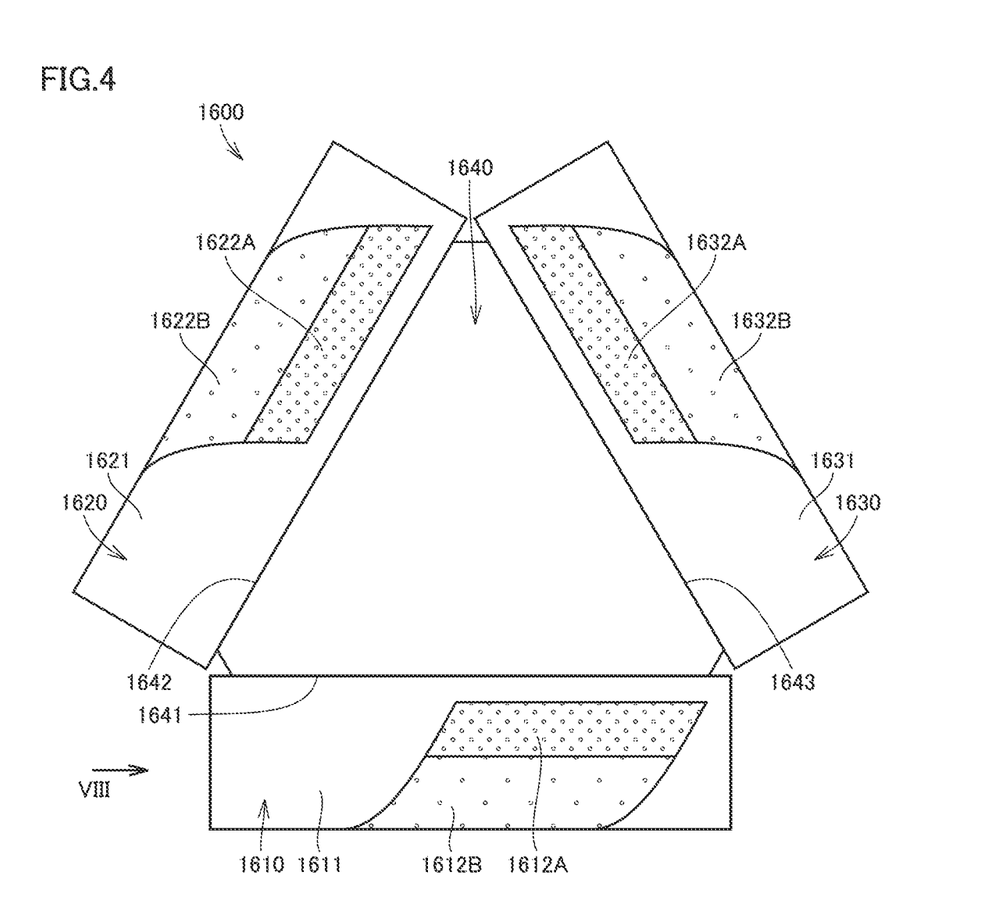
FIG. 4 is a plan view for illustrating a turnover apparatus of the electrode manufacturing apparatus according to the embodiment.

Details of turnover apparatus 1600 according to the embodiment will now be described. FIG. 4 is a plan view for illustrating turnover apparatus 1600 of electrode manufacturing apparatus 1000 according to the embodiment. As shown in FIG. 4, turnover apparatus 1600 includes a first turnover portion 1610, a second turnover portion 1620, a third turnover portion 1630, and a base portion 1640.

First turnover portion 1610 includes an outer surface 1611. Second turnover portion 1620 includes an outer surface 1621. Third turnover portion 1630 includes an outer surface 1631. Outer surfaces 1611, 1621, and 1631 of respective first turnover portion 1610, second turnover portion 1620, and third turnover portion 1630 are convexly curved. Outer surfaces 1611, 1621, and 1631 may be formed in a shape of a circular arc face defined by a part of a cylindrical surface. Outer surfaces 1611, 1621, and 1631 may be formed in a shape of an elliptic arc face. Outer surfaces 1611, 1621, and 1631 may be in a shape of a partial paraboloidal surface. Outer surfaces 1611, 1621, and 1631 may be formed in a shape of a plurality of convexly curved surfaces as being combined.

Outer surface 1611 includes a first region 1612A and a second region 1612B. Outer surface 1621 includes a first region 1622A and a second region 1622B. Outer surface 1631 includes a first region 1632A and a second region 1632B.

Base portion 1640 includes a first side 1641, a second side 1642, and a third side 1643. First turnover portion 1610 is fixed to first side 1641. Second turnover portion 1620 is fixed to second side 1642. Third turnover portion 1630 is fixed to third side 1643. First turnover portion 1610, second turnover portion 1620, and third turnover portion 1630 are formed as an integrated structure with base portion 1640 being interposed. First turnover portion 1610, second turnover portion 1620, and third turnover portion 1630 are constructed to be unable to move relatively to each other. First turnover portion 1610, second turnover portion 1620, and third turnover portion 1630 are positioned with respect to one another as being fixed to base portion 1640.

When base portion 1640 is two-dimensionally viewed, first side 1641, second side 1642, and third side 1643 of base portion 1640 define three sides of a convex polygon. First side 1641, second side 1642, and third side 1643 define three sides of a triangle. The triangle defined by first side 1641, second side 1642, and third side 1643 is an isosceles triangle with second side 1642 being defined as the base. The triangle defined by first side 1641, second side 1642, and third side 1643 is an equilateral triangle.

Since first side 1641, second side 1642, and third side 1643 define the triangle, first turnover portion 1610, second turnover portion 1620, and third turnover portion 1630 fixed to first side 1641, second side 1642, and third side 1643, respectively, are arranged in a triangular shape. Typically, first turnover portion 1610, second turnover portion 1620, and third turnover portion 1630 are arranged in a form of the equilateral triangle.

A virtual plane which intersects with each of outer surfaces 1611, 1621, and 1631 of first turnover portion 1610, second turnover portion 1620, and third turnover portion 1630 is discussed. First turnover portion 1610, second turnover portion 1620, and third turnover portion 1630 are each arranged across the virtual plane. A line of intersection between the virtual plane and outer surface 1611 of first turnover portion 1610, a line of intersection between the virtual plane and outer surface 1621 of second turnover portion 1620, and a line of intersection between the virtual plane and outer surface 1631 of third turnover portion 1630 each define a part of a side of a virtual triangle.

A virtual point of intersection between outer surfaces 1611 and 1621, a virtual point of intersection between outer surfaces 1621 and 1631, and a virtual point of intersection between outer surfaces 1631 and 1611 when outer surfaces 1611, 1621, and 1631 are virtually extended define three vertices of the virtual triangle. Outer surface 1611 shown in FIG. 4 defines a part of a side of the virtual triangle. Outer surface 1621 defines a part of a side of the virtual triangle. Outer surface 1631 defines a part of a side of the virtual triangle.

The virtual triangle is an isosceles triangle with outer surface 1621 of second turnover portion 1620 being defined as the base. The virtual triangle is the equilateral triangle.

Figure 5:
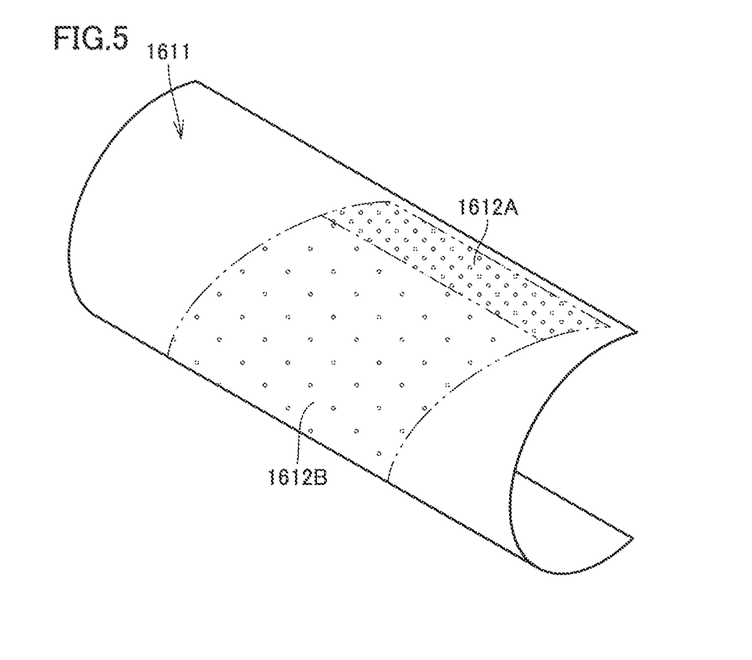
FIG. 5 is a perspective view showing an outer surface of a first turnover portion as being enlarged.
Figure 6:
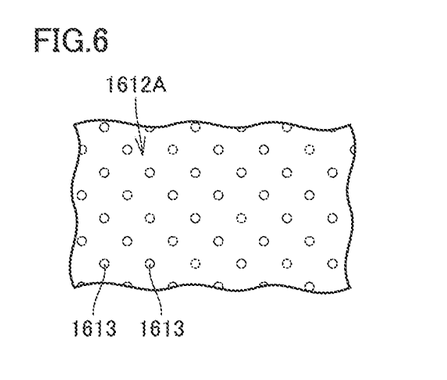
FIG. 6 is an enlarged view of a first region.
Figure 7:
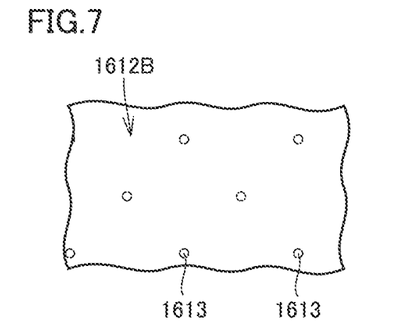
FIG. 7 is an enlarged view of a second region.

FIG. 5 is a perspective view showing outer surface 1611 of first turnover portion 1610 as being enlarged. FIG. 6 is an enlarged view of first region 1612A. FIG. 7 is an enlarged view of second region 1612B. As shown in FIGS. 5 to 7, a plurality of outlet holes 1613 are provided in first region 1612A and second region 1612B of outer surface 1611. An air passage through which gas (typically air) passes is provided in first turnover portion 1610, and the gas is issued to the outside of first turnover portion 1610 through outlet holes 1613.

The plurality of outlet holes 1613 are identical in shape. For example, the plurality of outlet holes 1613 are in an annular shape identical in diameter. Based on comparison between FIGS. 6 and 7, first region 1612A is smaller in interval between adjacent outlet holes 1613 than second region 1612B. First region 1612A is shorter in distance between centers of adjacent outlet holes 1613 than second region 1612B. Outlet holes 1613 are provided more densely in first region 1612A than in second region 1612B. First region 1612A and second region 1612B are different from each other in density of outlet holes 1613, and outlet holes 1613 are more densely provided in first region 1612A.

Typically, a density of outlet holes 1613 in first region 1612A is at least two times, for example, at least two times and at most three times, as high as a density of outlet holes 1613 in second region 1612B. An interval between adjacent outlet holes 1613 in second region 1612B is at least two times, for example, at least two times and at most three times, as large as an interval in first region 1612A.

The number of outlet holes 1613 per unit area in outer surface 1611 is larger in first region 1612A than in second region 1612B. A total area of opening per unit area owing to outlet holes 1613 provided in outer surface 1611 is greater in first region 1612A than in second region 1612B. Therefore, a flow rate per unit area of gas issued from first region 1612A is higher than a flow rate per unit area of gas issued from second region 1612B.

Figure 8:
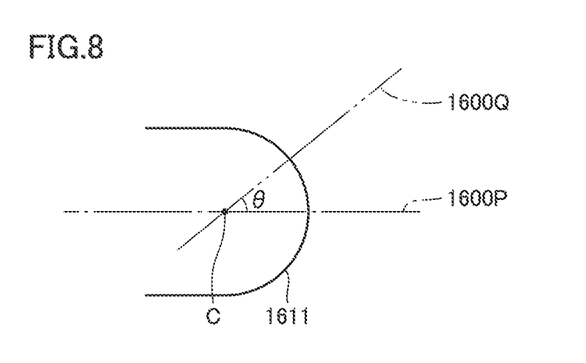
FIG. 8 is a schematic diagram illustrating a boundary between the first region and the second region.

FIG. 8 is a schematic diagram illustrating a boundary between first region 1612A and second region 1612B. FIG. 8 schematically shows outer surface 1611 of first turnover portion 1610 when first turnover portion 1610 is viewed laterally (a direction shown with an arrow VIII in FIG. 4).

A center C shown in FIG. 8 represents a center of curvature of convexly curved outer surface 1611. When outer surface 1611 is in an arc shape, center C represents an axis of center of curvature of a circle of curvature of the arc face. A straight line which passes through center C shown in FIG. 8 and is perpendicular to the sheet plane in FIG. 8 represents the axis of center of curvature of cylindrical outer surface 1611.

A straight line 1600P shown with a chain dotted line in FIG. 8 represents a plane which is in parallel to the virtual triangle defined by first side 1641, second side 1642, and third side 1643 of base portion 1640 and includes center C. The plane is in parallel to the sheet plane in FIG. 4. Straight line 1600P shown in FIG. 8 represents a plane including three straight lines which are axes of centers of curvature of circles of curvature when outer surfaces 1611, 1621, and 1631 each have a surface in an arc shape.

A straight line 1600Q shown with a chain double dotted line in FIG. 8 represents one example of a plane which includes center C and intersects with outer surface 1611. The plane results from rotational movement of the plane represented by straight line 1600P in FIG. 8 around a straight line which includes center C and is perpendicular to the sheet plane in FIG. 8 (that is, the axis of center of curvature of cylindrical outer surface 1611).

An angle θ shown in FIG. 8 is formed between straight line 1600P and straight line 1600Q shown in FIG. 8. Angle θ is formed by the plane (represented by straight line 1600Q) which includes the axis of center of curvature (center C) of outer surface 1611 and intersects with outer surface 1611 with respect to the plane (represented by straight line 1600P) which includes the axis of center of curvature (center C) of outer surface 1611 and is in parallel to the virtual triangle of which side is partially defined by outer surfaces 1611, 1621, and 1631.

First region 1612A is defined as a region where angle θ is not smaller than 60°. Second region 1612B is defined as a region where angle θ is smaller than 60°. Angle θ=60° defines a boundary between first region 1612A and second region 1612B.

Though first turnover portion 1610 has been described with reference to FIGS. 5 to 8 by way of example, second turnover portion 1620 and third turnover portion 1630 also include respective first regions 1622A and 1632A and respective second regions 1622B and 1632B, similarly to first turnover portion 1610.

[Operations to Turn Over Electrode Foil 2]

Figure 9:
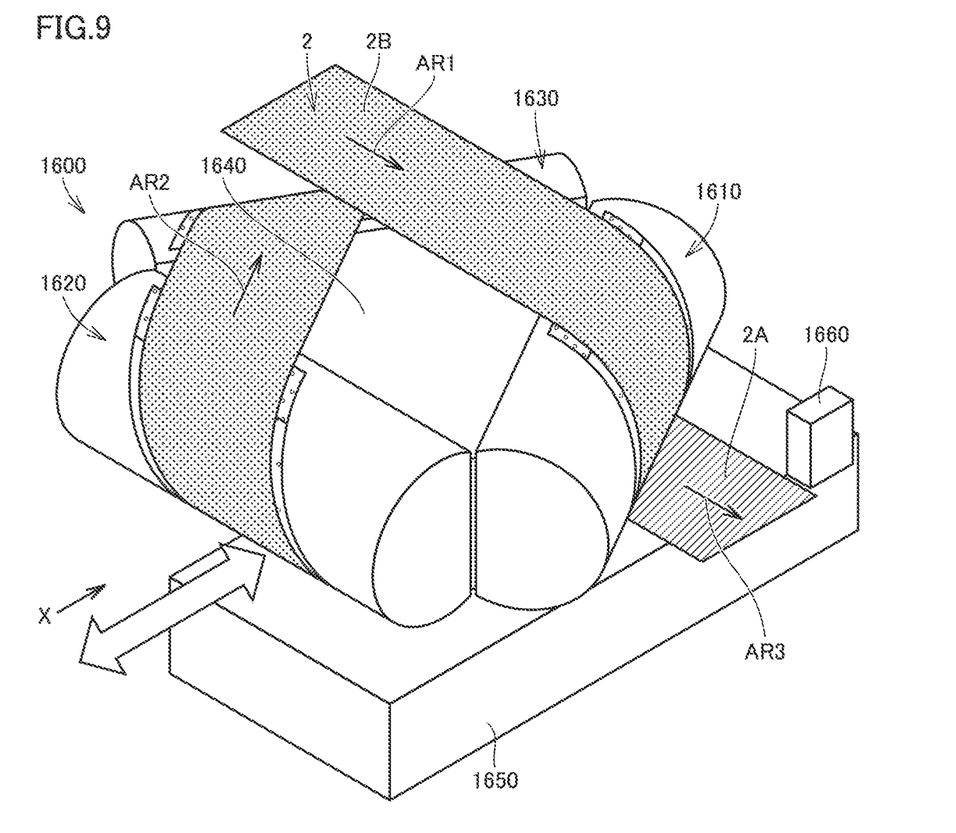
FIG. 9 is a perspective view showing turnover of the electrode foil by the turnover apparatus.

FIG. 9 is a perspective view showing turnover of electrode foil 2 by turnover apparatus 1600. Arrows AR1 to AR3 shown in FIG. 9 indicate a direction of transportation of electrode foil 2. Arrow AR1 indicates a direction of transportation of electrode foil 2 before it reaches turnover apparatus 1600. The direction shown with arrow AR1 corresponds to the direction shown with arrow J2 in FIG. 3. Arrow AR3 indicates a direction of transportation of electrode foil 2 after it passed through turnover apparatus 1600. The direction shown with arrow AR3 corresponds to the direction shown with arrow J3 in FIG. 3. In a plan view of turnover apparatus 1600, the direction shown with arrow AR3 is the same as the direction shown with arrow AR1. Namely, the directions of transportation of electrode foil 2 at the entrance and the exit of turnover apparatus 1600 are identical in the plan view.

Electrode foil 2 which has reached turnover apparatus 1600 is transported sequentially along outer surface 1611 of first turnover portion 1610, along outer surface 1621 of second turnover portion 1620, and along outer surface 1631 of third turnover portion 1630. Electrode foil 2 moves sequentially along first turnover portion 1610, second turnover portion 1620, and third turnover portion 1630 in turnover apparatus 1600. As electrode foil 2 is transported along respective outer surfaces 1611, 1621, and 1631 of first turnover portion 1610, second turnover portion 1620, and third turnover portion 1630 and turned over three times, first surface 2A and second surface 2B are replaced in position with each other as shown in FIG. 9.

As described above and as shown in FIG. 9, before electrode foil 2 reaches turnover apparatus 1600, second surface 2B of electrode foil 2 faces up, and after electrode foil 2 passed through turnover apparatus 1600, first surface 2A of electrode foil 2 faces up. FIG. 9 shows second surface 2B of electrode foil 2 as being dotted and shows first surface 2A as being hatched.

Electrode foil 2 is transported along first regions 1612A, 1622A, and 1632A and second regions 1612B, 1622B, and 1632B of outer surfaces 1611, 1621, and 1631 of respective first turnover portion 1610, second turnover portion 1620, and third turnover portion 1630. A number of outlet holes 1613 are provided in first region 1612A and second region 1612B in outer surface 1611 of first turnover portion 1610 and gas is issued from outlet holes 1613. Since transported electrode foil 2 is supported by a pressure of the gas, transported electrode foil 2 is moved away from outer surface 1611 and does not come in contact with first turnover portion 1610.

Similar outlet holes are provided also in first region 1622A and second region 1622B in outer surface 1621 of second turnover portion 1620, and the gas is issued from the outlet holes. Since transported electrode foil 2 is supported by a pressure of the gas, transported electrode foil 2 is moved away from outer surface 1621 and electrode foil 2 does not come in contact with second turnover portion 1620. Similar outlet holes are provided also in first region 1632A and second region 1632B in outer surface 1631 of third turnover portion 1630, and the gas is issued from the outlet holes. Since transported electrode foil 2 is supported by a pressure of the gas, transported electrode foil 2 is moved away from outer surface 1631 and electrode foil 2 does not come in contact with third turnover portion 1630.

Figure 10:
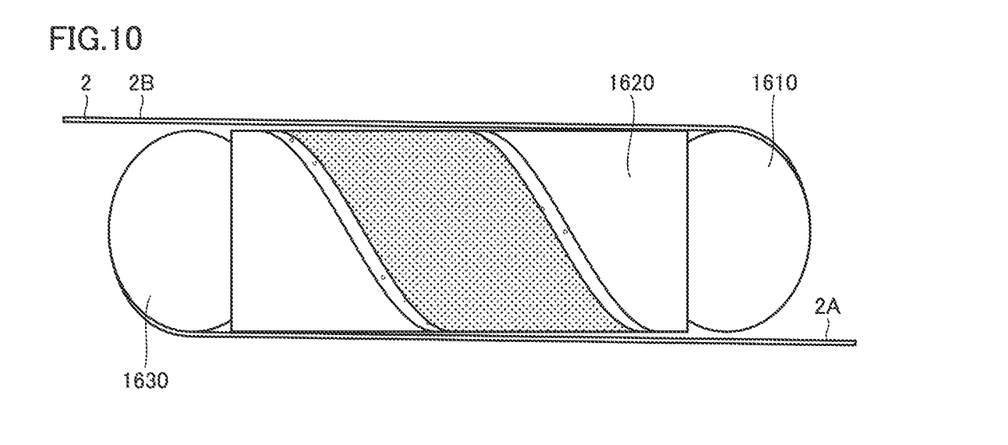
FIG. 10 is a side view showing arrangement of the electrode foil with respect to the turnover apparatus.

FIG. 10 is a side view showing arrangement of electrode foil 2 with respect to turnover apparatus 1600. FIG. 10 shows turnover apparatus 1600 and electrode foil 2 viewed in a direction shown with an arrow X in FIG. 9.

Before electrode foil 2 reaches first turnover portion 1610, electrode foil 2 passes above base portion 1640. Electrode foil 2 is transported not in parallel to an upper surface of base portion 1640 but obliquely downward and reaches first turnover portion 1610. After electrode foil 2 passed through third turnover portion 1630, electrode foil 2 passes below base portion 1640. After electrode foil 2 passed through third turnover portion 1630, electrode foil 2 is transported not in parallel to a lower surface of base portion 1640 but obliquely downward. Therefore, base portion 1640 does not interfere with electrode foil 2.

In a process of turning over electrode foil 2 to replace first surface 2A and second surface 2B in position with each other by passage of electrode foil 2 through turnover apparatus 1600, electrode foil 2 is kept from coming in contact with turnover apparatus 1600.

[Adjustment of Position of Electrode Foil 2 in Passage Through Turnover Apparatus 1600]

Referring back to FIG. 9, electrode manufacturing apparatus 1000 further includes a drive portion 1650 and a sensor 1660. A hollow double-headed arrow shown in FIG. 9 indicates a direction orthogonal to the direction of transportation of electrode foil 2 (the direction shown with arrow AR1 and the direction shown with arrow AR3 in FIG. 9 or the direction shown with arrow J2 and the direction shown with arrow J3 in FIG. 3), and this direction is referred to as an orthogonal direction. Second turnover portion 1620 extends in the direction shown with arrow AR1 and the direction shown with arrow AR3 which indicate the direction of transportation of electrode foil 2. Drive portion 1650 has turnover apparatus 1600 carry out reciprocating motion in the orthogonal direction. Sensor 1660 is arranged downstream from turnover apparatus 1600 in the direction of transportation of electrode foil 2. Sensor 1660 determines a position of electrode foil 2 in the orthogonal direction after the electrode foil passed through turnover apparatus 1600.

Figure 11:
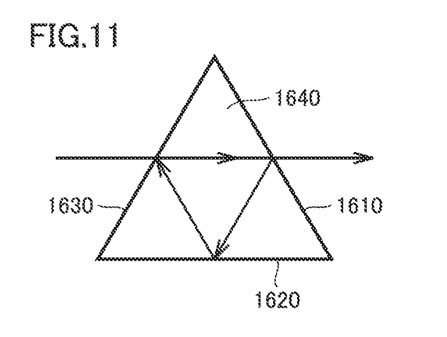
FIG. 11 is a first schematic diagram illustrating adjustment of a position in an orthogonal direction of the electrode foil by the turnover apparatus.
Figure 12:
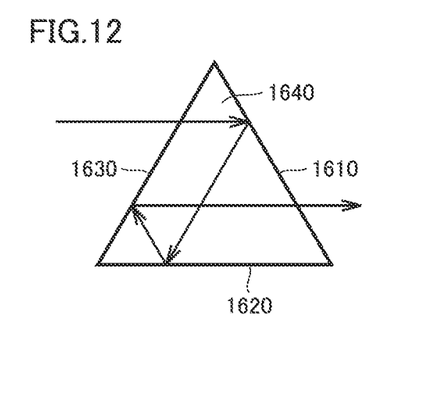
FIG. 12 is a second schematic diagram illustrating adjustment of a position in the orthogonal direction of the electrode foil by the turnover apparatus.

FIG. 11 is a first schematic diagram illustrating adjustment of a position in the orthogonal direction of electrode foil 2 by turnover apparatus 1600. FIG. 11 and FIG. 12 which will be described later show base portion 1640 as well as first turnover portion 1610, second turnover portion 1620, and third turnover portion 1630 fixed to base portion 1640 of turnover apparatus 1600 schematically with an equilateral triangle and show electrode foil 2 transported through turnover apparatus 1600 schematically with an arrow. The lateral direction in FIGS. 11 and 12 indicates the direction of transportation of electrode foil 2 and a vertical direction in FIGS. 11 and 12 indicates the orthogonal direction.

Electrode foil 2 which has reached turnover apparatus 1600 is turned over sequentially in first turnover portion 1610, second turnover portion 1620, and third turnover portion 1630 arranged in a triangular shape. Since first turnover portion 1610, second turnover portion 1620, and third turnover portion 1630 are integrally fixed and accurately positioned, aggravation of position displacement of electrode foil 2 in the orthogonal direction in passage through turnover apparatus 1600 is suppressed.

When electrode foil 2 which has reached turnover apparatus 1600 is free from position displacement in the orthogonal direction, a position in the orthogonal direction of electrode foil 2 which passed through turnover apparatus 1600 is set at the same position as electrode foil 2 which has reached turnover apparatus 1600 as shown in FIG. 11. Electrode foil 2 is thus free from position displacement in the orthogonal direction also after it passed through turnover apparatus 1600.

FIG. 12 is a second schematic diagram illustrating adjustment of a position in the orthogonal direction of electrode foil 2 by turnover apparatus 1600. As drive portion 1650 moves turnover apparatus 1600 in the orthogonal direction, turnover apparatus 1600 shown in FIG. 12 is arranged at a position different in the orthogonal direction from the position in FIG. 11. As shown in FIG. 12, electrode foil 2 which passed through turnover apparatus 1660 which has moved in the orthogonal direction as compared with the position in FIG. 11 is varied in position in the orthogonal direction as compared with electrode foil 2 which has reached turnover apparatus 1600.

When electrode foil 2 which has reached turnover apparatus 1600 is displaced in position in the orthogonal direction, the position of electrode foil 2 in the orthogonal direction can be changed by moving turnover apparatus 1600 in the orthogonal direction as shown in FIG. 12. The position of electrode foil 2 is thus adjusted so as to avoid position displacement in the orthogonal direction of electrode foil 2 which passed through turnover apparatus 1600. Absence of position displacement of electrode foil 2 after passage through turnover apparatus 1600 is determined based on a result of determination by sensor 1660.

[Function and Effect]

Characteristic features as well as functions and effects of electrode manufacturing apparatus 1000 in the embodiment will be listed below, although they are partially redundant with the description above.

In electrode manufacturing apparatus 1000 in the embodiment, turnover apparatus 1600 includes first turnover portion 1610, second turnover portion 1620, and third turnover portion 1630 as shown in FIG. 4. First turnover portion 1610, second turnover portion 1620, and third turnover portion 1630 are integrally fixed. Outer surfaces 1611, 1621, and 1631 of first turnover portion 1610, second turnover portion 1620, and third turnover portion 1630 each define a part of a side of a virtual triangle.

Unlike the conventional construction in which first to third turnover members are individually arranged, first turnover portion 1610, second turnover portion 1620, and third turnover portion 1630 are integrated to form an integrated structure. Since turnover apparatus 1600 is unitized and reduced in size, a space required for arrangement of turnover apparatus 1600 is reduced. Therefore, electrode manufacturing apparatus 1000 can be reduced in size.

By improving accuracy in machining of base portion 1640 and accuracy in attachment of first turnover portion 1610, second turnover portion 1620, and third turnover portion 1630 to base portion 1640, accuracy in relative positioning of first turnover portion 1610, second turnover portion 1620, and third turnover portion 1630 is improved. Electrode foil 2 is transported along each of outer surfaces 1611, 1621, and 1631 of first turnover portion 1610, second turnover portion 1620, and third turnover portion 1630 in this order. Improvement in accuracy in positioning of first turnover portion 1610, second turnover portion 1620, and third turnover portion 1630 suppresses position displacement of electrode foil 2 in the orthogonal direction orthogonal to the direction of transportation during passage of electrode foil 2 through turnover apparatus 1600.

Such a situation that position displacement of electrode foil 2 in the orthogonal direction exceeds an allowable value at the exit of turnover apparatus 1600 can thus be avoided. Unlike the conventional construction, an end position control device for alignment of electrode foil 2 in the orthogonal direction does not have to be provided at the entrance of turnover apparatus 1600. Therefore, electrode manufacturing apparatus 1000 can be reduced in size.

The end position control device adjusts a position of electrode foil 2 by transporting electrode foil 2 along an outer circumferential surface of a roll-like member and twisting the roll-like member. As the roll-like member is twisted while electrode foil 2 is in contact with the outer circumferential surface of the roll-like member, a material which forms electrode foil 2 or the roll-like member is locally worn and a foreign matter may be produced. Therefore, a foreign matter removal apparatus such as an air blower is required downstream from the end position control device. In contrast, according to the construction in the embodiment without requiring an end position control device, a foreign matter removal apparatus is not required either, and hence further simplification of the construction and reduction in size of electrode manufacturing apparatus 1000 can be achieved.

As shown in FIG. 4, turnover apparatus 1600 includes base portion 1640. First turnover portion 1610 is fixed to first side 1641 of base portion 1640, second turnover portion 1620 is fixed to second side 1642 of base portion 1640, and third turnover portion 1630 is fixed to third side 1643 of base portion 1640. By doing so, first turnover portion 1610, second turnover portion 1620, and third turnover portion 1630 can form an integrated structure with base portion 1640 being interposed.

As shown in FIG. 4, a plurality of outlet holes 1613 are provided in outer surfaces 1611, 1621, and 1631 of first turnover portion 1610, second turnover portion 1620, and third turnover portion 1630. Outer surface 1611 includes first region 1612A and second region 1612B. As shown in FIGS. 5 to 8, first region 1612A is smaller in interval between adjacent outlet holes 1613 than second region 1612B. Therefore, a flow rate per unit area of gas issued from first region 1612A is higher than a flow rate per unit area of gas issued from second region 1612B.

Electrode foil 2 is moved away from outer surfaces 1611, 1621, and 1631 owing to a pressure of the gas issued from outlet holes 1613. By having more gas issued in first region 1612A where electrode foil 2 is less likely to be moved away from outer surface 1611 owing to a small angle formed between the upper surface or the lower surface of base portion 1640 and electrode foil 2, electrode foil 2 is more readily moved away from outer surface 1611. Electrode foil 2 can thus readily be turned over.

As shown in FIGS. 6 and 7, a plurality of outlet holes 1613 are identical in shape. In order to achieve a flow rate of gas higher in first region 1612A than in second region 1612B, a shape of outlet hole 1613 may be varied, for example, by increasing a diameter of outlet hole 1613. According to such a construction that outlet holes 1613 identical in shape are densely arranged, however, machining of outlet holes 1613 is facilitated. For example, in providing outlet holes 1613 by laser machining, in order to change a shape of outlet hole 1613, power of laser should be adjusted. When outlet holes 1613 are identical in shape, however, machining for providing holes should only be performed at the same power and outlet holes 1613 can efficiently be machined.

As shown in FIG. 9, electrode manufacturing apparatus 1000 includes drive portion 1650 configured to move turnover apparatus 1600 in the orthogonal direction orthogonal to the direction of transportation of electrode foil 2. By moving the entire turnover apparatus 1600 in the orthogonal direction, electrode foil 2 turned over by turnover apparatus 1600 can be aligned in the orthogonal direction as shown in FIGS. 11 and 12. Turnover apparatus 1600 itself can rectify position displacement of electrode foil 2 in the orthogonal direction while it turns over electrode foil 2, and ideally, position displacement can be rectified at the exit of turnover apparatus 1600. Therefore, an end position control device for alignment of electrode foil 2 in the orthogonal direction does not have to be provided at the exit of turnover apparatus 1600. Therefore, electrode manufacturing apparatus 1000 can be reduced in size.

By determining a position in the orthogonal direction of turned-over electrode foil 2 with sensor 1660, position displacement in the orthogonal direction due to turnover can be determined and a position of electrode foil 2 can highly accurately be adjusted.

Figure 13:
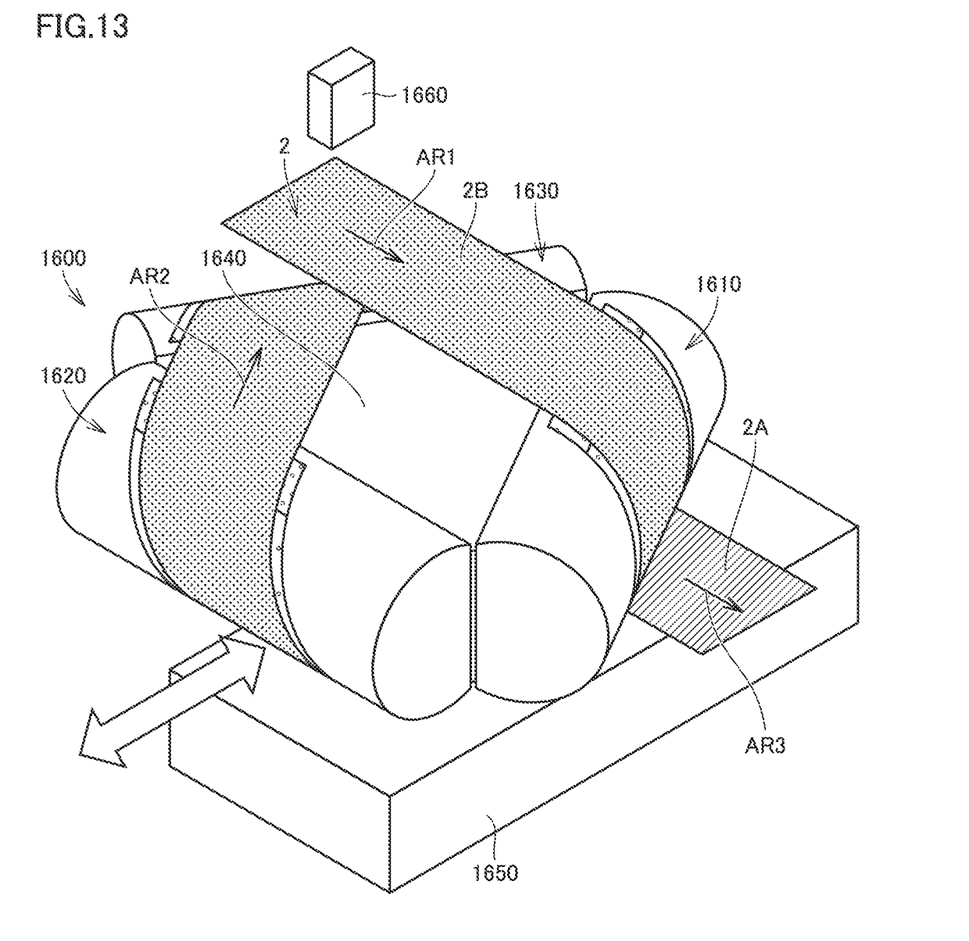
FIG. 13 is a perspective view showing a schematic construction of the turnover apparatus in a modification.

Though FIG. 9 shows sensor 1660 configured to determine a position in the orthogonal direction of electrode foil 2 which passed through turnover apparatus 1600, arrangement of sensor 1660 is not limited as such. FIG. 13 is a perspective view showing a schematic construction of turnover apparatus 1600 in a modification. As shown in FIG. 13, sensor 1660 may be arranged upstream from turnover apparatus 1600 in the direction of transportation and configured to determine a position of electrode foil 2 before the electrode foil reaches turnover apparatus 1600.

In consideration of the fact that electrode foil 2 is transported to second surface coating die 1221 and second surface 2B is coated with a coating material after the electrode foil passed through turnover apparatus 1600 as shown in FIG. 3, the construction shown in FIG. 9 for determining a position of electrode foil 2 turned over by turnover apparatus 1600 is more preferred. When it is difficult to arrange sensor 1660 downstream from turnover apparatus 1600 in consideration of interference with other apparatuses, sensor 1660 can also be arranged upstream from turnover apparatus 1600 as shown in FIG. 13, so that a degree of freedom in design is improved. By determining a position in the orthogonal direction before the electrode foil reaches turnover apparatus 1600 and making adjustment to eliminate position displacement of electrode foil 2 before turnover, position displacement of electrode foil 2 which passed through turnover apparatus 1600 can be lessened.

As shown in FIGS. 4 and 9 to 11, the virtual triangle is an isosceles triangle. Second turnover portion 1620 extends in the direction of transportation of electrode foil 2 and outer surface 1621 of second turnover portion 1620 defines a part of the base of the isosceles triangle. According to such a construction, a position of electrode foil 2 in the orthogonal direction can readily be adjusted with a simplified operation to move turnover apparatus 1600 in the orthogonal direction.

As shown in FIGS. 4 and 9 to 11, the virtual triangle is the equilateral triangle. According to such a construction, first turnover portion 1610, second turnover portion 1620, and third turnover portion 1630 can be identical in outer geometry. Therefore, the number of components can be reduced and cost for electrode manufacturing apparatus 1000 can be reduced.

Though first turnover portion 1610, second turnover portion 1620, and third turnover portion 1630 of turnover apparatus 1600 are integrated with base portion 1640 being interposed in the description so far, limitation to this construction is not intended. First turnover portion 1610, second turnover portion 1620, and third turnover portion 1630 may be formed as an integrated structure by being directly fixed to one another without base portion 1640 being interposed.

First turnover portion 1610, second turnover portion 1620, and third turnover portion 1630 do not necessarily have to be arranged at the same position in the vertical direction (in the direction vertical to the sheet plane in FIG. 4) so long as there is one plane intersecting with each of outer surfaces 1611, 1621, and 1631 and the virtual triangle described above is formed on that plane. For example, first turnover portion 1610 may be arranged as being displaced above second turnover portion 1620 and third turnover portion 1630 may be arranged as being displaced below second turnover portion 1620.

Though electrode manufacturing apparatus 100 according to the embodiment includes coating portion 1200 configured to coat first surface 2A and second surface 2B with a coating material as an electrode composite material layer formation portion configured to form respective electrode composite material layers 3A and 3B on first surface 2A and second surface 2B of electrode foil 2, limitation to this example is not intended. Electrode composite material layers 3A and 3B may be formed, for example, with a method of transferring an electrode layer to first surface 2A and second surface 2B of electrode foil 2, or may be formed with any other methods.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An electrode manufacturing apparatus comprising:
    an electrode composite material layer formation portion which forms an electrode composite material layer on a first surface and a second surface of an electrode foil, the second surface being opposite to the first surface; and
    a turnover apparatus which turns over the electrode foil such that the first surface and the second surface of the electrode foil are replaced in position with each other, the turnover apparatus including a first turnover portion, a second turnover portion, and a third turnover portion each including a convexly curved outer surface, the first surface and the second surface being replaced in position with each other as the electrode foil is transported along the outer surface of each of the first turnover portion, the second turnover portion, and the third turnover portion in this order,
    the first turnover portion, the second turnover portion, and the third turnover portion being integrally fixed,
    the outer surface of each of the first turnover portion, the second turnover portion, and the third turnover portion defining at least a part of each side of a virtual triangle,
    a direction of transportation of the electrode foil at an entrance of the turnover apparatus and a direction of transportation of the electrode foil at an exit of the turnover apparatus are identical in a plan view, and planes in which the electrode foil enters the turnover apparatus and exits the turnover apparatus are parallel to each other.

2. The electrode manufacturing apparatus according to claim 1, wherein
    the turnover apparatus further includes a base portion which includes a first side to which the first turnover portion is fixed, a second side to which the second turnover portion is fixed, and a third side to which the third turnover portion is fixed.

3. The electrode manufacturing apparatus according to claim 1, wherein
    a plurality of outlet holes from which gas is issued to move the electrode foil away from the outer surfaces of the first turnover portion, the second turnover portion, and the third turnover portion are provided in the outer surface of each of the first turnover portion, the second turnover portion, and the third turnover portion,
    the outer surface of each of the first turnover portion, the second turnover portion, and the third turnover portion includes a first region in which an angle formed by a plane including an axis of center of curvature of the respective outer surface of each of the first turnover portion, the second turnover portion, and the third turnover portion and intersecting with the respective outer surface of each of the first turnover portion, the second turnover portion, and the third turnover portion with respect to a plane including the axis of center of curvature and being in parallel to the virtual triangle is not smaller than 60° and a second region in which the angle is smaller than 60°, and
    a flow rate per unit area of the gas issued from the respective first region of the outer surface of each of the first turnover portion, the second turnover portion, and the third turnover portion is higher than a flow rate per unit area of the gas issued from the second region.

4. The electrode manufacturing apparatus according to claim 3, wherein
    intervals between adjacent outlet holes in the first region of the outer surface of each of the first turnover portion, the second turnover portion, and the third turnover portion are smaller than intervals between adjacent outlet holes in the second region of the outer surface of each of the first turnover portion, the second turnover portion, and the third turnover portion.

5. The electrode manufacturing apparatus according to claim 4, wherein
    a plurality of the outlet holes are identical in shape.

6. The electrode manufacturing apparatus according to claim 1, the electrode manufacturing apparatus further comprising:
    a sensor configured to determine a position of the electrode foil in an orthogonal direction orthogonal to the direction of transportation of the electrode foil; and
    a drive portion configured to move the turnover apparatus in the orthogonal direction.

7. The electrode manufacturing apparatus according to claim 6, wherein
    the sensor is arranged downstream from the turnover apparatus in the direction of transportation and configured to determine a position in the orthogonal direction of the electrode foil which passed through the turnover apparatus.

8. The electrode manufacturing apparatus according to claim 1, wherein
    the second turnover portion extends in the direction of transportation of the electrode foil, and the virtual triangle is an isosceles triangle, at least a part of a base of the isosceles triangle being defined by the outer surface of the second turnover portion.

9. The electrode manufacturing apparatus according to claim 8, wherein
the virtual triangle is an equilateral triangle.

\* \* \* \* \*